United States Patent [19]

Tovar

[11] Patent Number: 4,956,083

[45] Date of Patent: Sep. 11, 1990

[54] WATER PURIFICATION DEVICE

[76] Inventor: Domingo Tovar, 8530 Cedros Ave., #7, Panorama City, Calif. 91402

[21] Appl. No.: 359,607

[22] Filed: Jun. 1, 1989

[51] Int. Cl.$^5$ ............................................. C02F 1/48
[52] U.S. Cl. ..................................... 210/222; 210/695
[58] Field of Search ............... 210/222, 223, 695, 748; 366/336, 338, 339

[56] References Cited

U.S. PATENT DOCUMENTS

| | | | |
|---|---|---|---|
| 4,151,090 | 4/1979 | Brigante | 210/222 |
| 4,659,479 | 4/1987 | Stickler et al. | 210/695 |
| 4,746,425 | 5/1988 | Stickler et al. | 210/695 |

Primary Examiner—W. Gary Jones
Assistant Examiner—Matthew O. Savage
Attorney, Agent, or Firm—John J. Posta, Jr.

[57] ABSTRACT

The water purification device includes a hollow casing split into a pair of mating sections releasably connected together for easy access to the inside of the casing. A water pipe is disposed in the casing, extends out opposite ends thereof and bears connectors for connection to water-bearing plumbing and the like. A non-rotating removable and replaceable water impeller having a spaced number of blade segments is disposed longitudinally on the water pipe to control mixing and the residence time of water passing through the pipe. The impeller can be in the form of a single helix or in the form of a flexible accordion-pleated band which is longitudinally urgeable between a collapsed and an extended position to control the number and pitch of the blade segments or pleats in a selected portion of the pipe. That selected portion is disposed in an electromagnetic coil in the casing, which coil, when energized, causes sediment in the water to dissolve and pulverize. The coil is energized through electrical components in the casing, including a condensor, a transformer, a resistor and electrical circuitry interconnected to the coil. The device is compact and efficient.

3 Claims, 2 Drawing Sheets

WATER PURIFICATION DEVICE

BACKGROUND OF THE INVENTION

1. Field of the Invention

The present invention generally relates to purifiers and, more particularly, to an electromagnetic water purifier of an improved type.

2. Prior Art

Conventional water treatment processes usually employ expensive consumable chemicals to trap, neutralize, precipitate and/or dissolve undesired minerals and other materials in water supplies, for, for example, cooling towers, home and office tap water, etc. The treated water in such processes usually has undesirable characteristics, e.g., it may be extremely "soft" so as to make it difficult to wash out soaps, etc. It also may have an undesired taste, odor and/or appearance. Moreover, scaly precipitates or metallic surfaces in the plumbing bearing such water may occur over a period of time, eventually impairing their function.

An improved, inexpensive substitute water treatment system has been devised, which system exerts electromagnetism on water while the water being treated is being held or mixed in a residence zone so as to pulverize, modify and dissolve undesired substances in the water without the use of any chemicals. Scale and other precipitates in the system are fully suppressed, because the solids in the water so treated are reduced in size and weight and in their ability to adhere to substrates. The system is equally effective with water from ducts, rivers, whirlpools, lakes, city treatment plants, etc.

That improved system unfortunately has several major drawbacks. Thus, the system employs a rotating impeller within the zone of electromagnetism. The impeller, due to rapid, continuous rotation, readily breaks down; that is, its bearings easily and rapidly wear out. Moreover, replacement of the impeller and other components of the system is difficult because the container holding such components is difficult to open and access to the components therein is limited. It has also been found that under certain circumstances it is desirable to charge the mixing and residence time of water passing through the electromagnetic zone. That cannot be readily accomplished with the described improved system.

There remains a need for a further improved system which overcomes the foregoing drawbacks. Thus, such a further improved system should not have an impeller which rapidly wears out, nor should the components thereof be difficult to service and replace. Moreover, the degree of mixing and the residence time of the water in the system should be easily changeable for maximum adaptability to various types of water.

SUMMARY OF THE INVENTION

The improved water treatment device of the present invention satisfies all the foregoing needs. The device is substantially as set forth in the Abstract of the Disclosure. Thus, the device employs a clam-shell-type split casing holding a water pipe which extends out the opposite ends thereof and which contains a non-rotating readily removable and replaceable water impeller which preferably is a single helix. Alternatively, the impeller can be an accordion-pleated strip or band, which is collapsable and openable, so as to regulate the number of pleats and their pitch within the treating zone in the pipe. Still, alternatively, the impeller can be a helix or rod bearing blades which can be positioned at various points in and out of the treating zone. That treating zone is enclosed in an electromagnetic coil in the casing, which coil is energized by an alternating current external power source through electrical components such as a transformer, resistor and condensor within the casing. The electrical components and coil are readily accessible in the casing. The impeller is releasably pinned in the pipe and easily replaced therein. The device is long lasting, simple, efficient and adaptable to a variety of applications. It can be connected directly into a water circulation system for a water heater, cooling tower, refrigeration unit, etc.

Further features of the invention are set forth in the following detailed description and accompanying drawings.

DRAWINGS

DETAILED DESCRIPTION

Figures 1, 2 & 5

Figure 1:
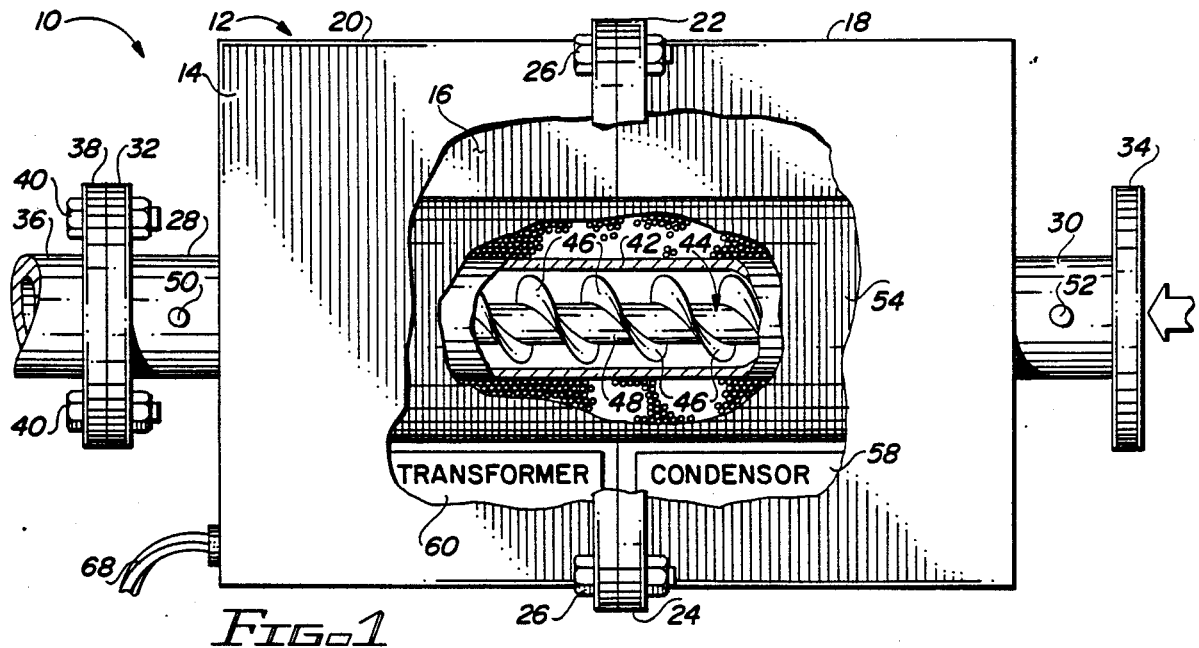
FIG. 1 is a schematic side elevation, partly broken away, and partly in section, of a first preferred embodiment of the improved water treatment device of the present invention, shown connected at one end thereof to water-bearing plumbing or piping.
Figure 2:
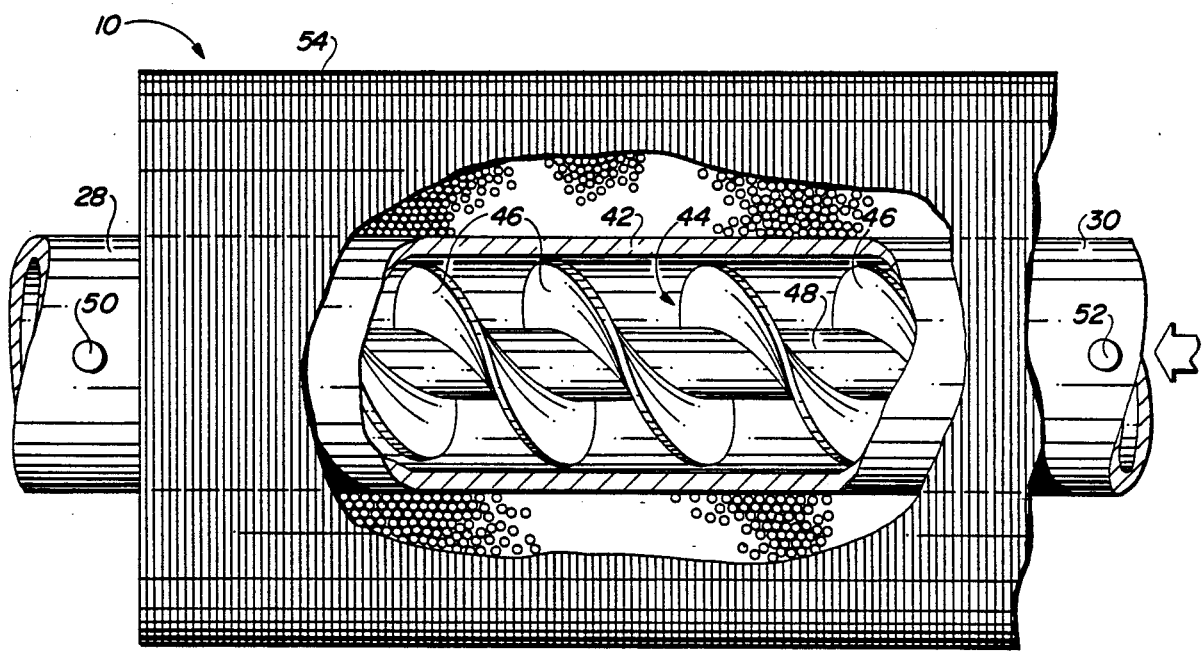
FIG. 2 is an enlarged fragmentary schematic side elevation, partly broken away and partly in section, of the electromagnetic coil, water pipe and impeller of the device of FIG. 1.
Figure 5:
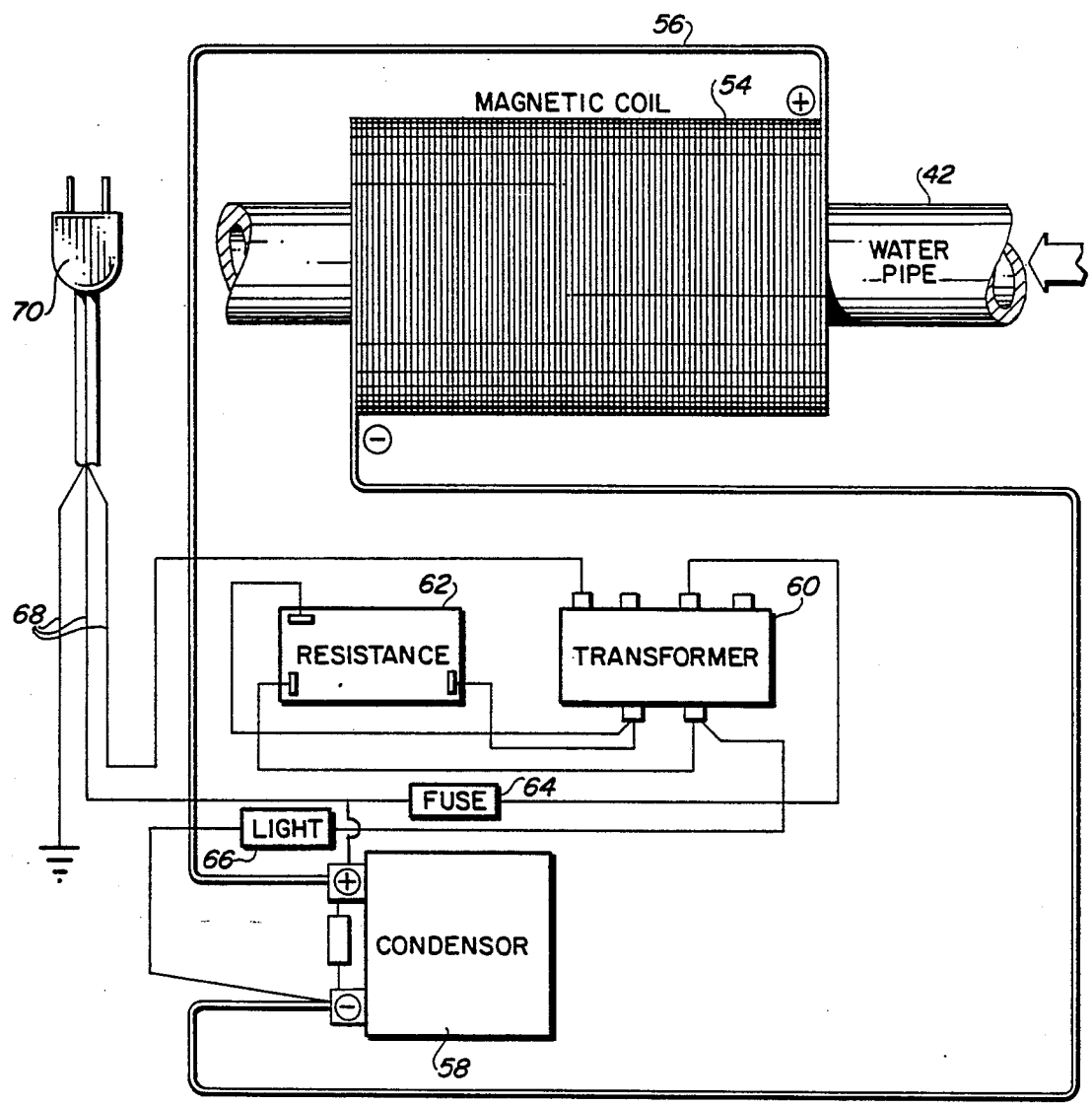

Now referring more particularly to FIGS. 1, 2 & 5 of the drawings, a first preferred embodiment of the improved water treatment device of the present invention is schematically depicted therein. Thus, device 10 is shown, which comprises a closed preferably square or rectangular casing 12 having a plurality of interconnected walls 14 collectively defining a central space 16. Casing 12 is split vertically into two mating halves 18 & 20 bearing peripheral flanges 22 & 24 releasably connected together by bolts 26. Access to space 16 is made easy, merely by disconnecting halves 18 & 20.

Aligned pipes 28 & 30 are connected to halves 18 & 20 and bear peripheral flanges 32 and 34 respectively, for connection to plumbing such as pipe 36 through flange 38 and bolts 40. Space 16 includes a water pipe 42 integral with external pipes 28 and 30 for passage of water into, through and out casing 12 in the direction of the arrow in FIG. 1. Pipe 42 has a non-rotating impeller 44 in the form of a fixed helix extending the length of pipe 42 in casing 12. Impeller 44 has blade segments 46 at a predetermined pitch and extending around and connected to a central longitudinal impeller core rod 48 releasably pinned in place by cross pins 50 & 52 extending through pipes 28 and 30, respectively.

Impeller 44 is enclosed in an electro magnetic coil 54 connected to electrical components in casing 12. Thus, as shown in FIG. 5, coil 54 is interconnected by circuitry generally designated as 56 to a condensor 58, transformer 60, resistor 62, fuse 64, light 66 and an external three wire electrical conduit 68 with plug 70. Plug 70 releasably connects coil 54 to a remote source of alternating current, such as house current (not shown).

When coil 54 is energized, it becomes an electro-magnet, exerting the desired purification effect on water passing through pipe 30 into casing 12 from a water circulation system and held in pipe 42 for a desired residence time by impeller 44, before exiting casing 12 into the water circulation system (not shown). Impeller 44 also desirably agitates and mixes water in pipe 42 so that all of such water has the same residence time and is treated equally.

It will be noted that because impeller 44 is non-rotating, it can be made to just touch the inner periphery of pipe 42; that is, it can be made large enough to just slide in pipe 42, thus preventing the existence of a peripheral gap between impeller 44 and that inner periphery. Such a gap would, as in the case of rotary impellers which require such a gap for proper blade clearance, allow a layer of water to pass rapidly through that gap without the proper mixing and residence time necessary for adequate treatment of the water. Accordingly, the non-rotating impeller 44 has a distinct advantage over rotating impellers.

Because impeller 44 is fixed in place by removable pins 50 and 52, it does not have any bearings which would wear out, but it can still be readily replaced at any time with a like impeller of different blade pitch, if desired, in order to change the residence time to meet changing water purification needs. Pins 50 and 52 can be pulled and impeller 44 can be slid out pipe 30 and changed. In order to make the change in impeller, it will be understood that pipe 30 would first be disconnected from plumbing of the external water circulation system (not shown) releasably secured to flange 34. Flange 32 of pipe 28 is similarly releasably connectable to pipes of a water circulation system (not shown).

Figure 3:
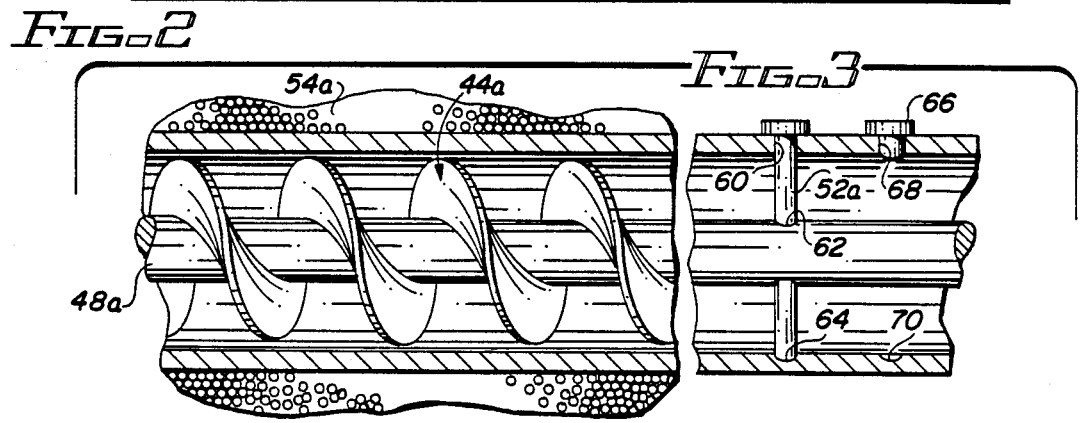
FIG. 3 is a schematic fragmentary side elevation, partly in section, of a second preferred embodiment of the coil, impeller and water pipe of the device of the present invention.

As previously indicated, when water is treated with device 10, the electro magnetic flux passing through the water in pipe 42 modifies the mineral substances in the water, neutralizing and pulverizing them; it decreases their size and density and their adhesion to pipes, while it increases their solubility. Scale and rust accumulation are avoided, expensive chemicals are obviated and water becomes soft and pure. Thus, the device saves energy and time, and it reduces pollution. Moreover, the device is easy to use and very durable, without moving parts to wear out. Access to all of its components is simple and easy. Figure 3

Figure 4:
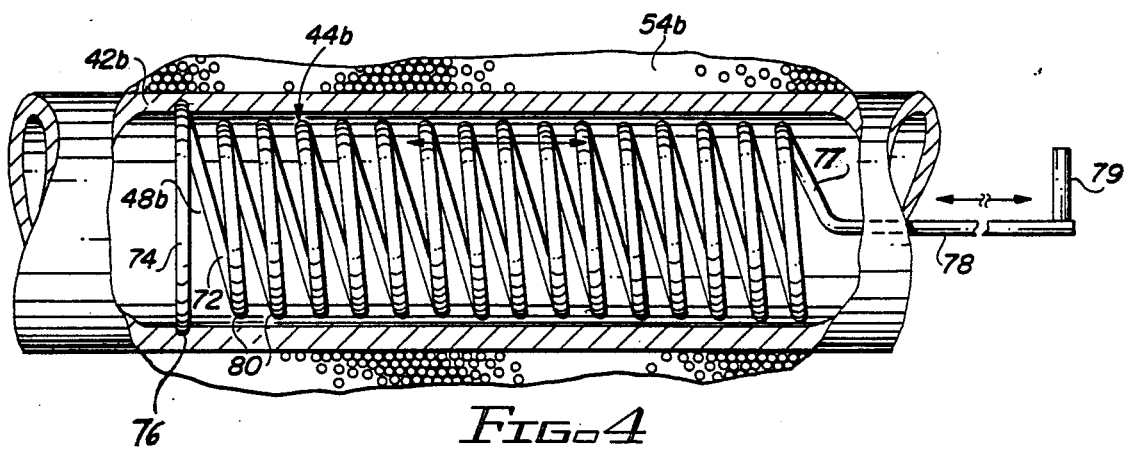
FIG. 4 is a schematic fragmentary side elevation, partly broken away and partly in section, of a third preferred embodiment of the coil, water pipe and impeller of the present device; and, FIG. 5 is a schematic electric circuit diagram of the electrical components used in the device of FIG. 1.

A second preferred embodiment of the impeller and its manner of releasable connection in the device of the present invention is schematically depicted in FIG. 3. Thus, impeller 44a is shown, along with pipes 42a and 30a, and coil 54a. Impeller 44a is substantially identical to impeller 44, but has a slightly different blade pitch. Rod 48a of impeller 44a is releasably pinned in place by pin 52a passing through opening 60 in pipe 30a and opening 62 in rod 48a, and it seats in recess 64 in pipe 30a. When the amount of impeller 44a within electromagnetic coil 54a is to be adjusted, in order to adjust the water mixing and residence time within coil 54a, pin 52a can be used to releasably pin rod 48a at a different location in pipe 30a, for example, by removing plug 66 in opening 68 and reseating pin 52 in opening 68 and groove 70. Pipe 42a, impeller 44a and pipe 30a are otherwise identical to pipe 42, impeller 44 and pipe 30 and are fully substitutable therefor in device 10. Figure 4

A third preferred embodiment of the improved impeller used in device 10 is schematically depicted in FIG. 4. Thus, impeller 44b is shown in pipe 42b within coil 54b. Impeller 44b includes an accordion-pleated flexible strip or band 72 having front end 74 thereof anchored in a peripheral groove 76 in the inner surface of pipe 42b. Impeller 44b includes a stabilizing rod 48b passing through central openings (not shown) in strip 72. Rear end 77 of strip 72 ends in a tab 78 which can be connected to a remotely positioned push rod 79 or the like to urge strip 72 between a collapsed position and an expanded (extended) position, thus regulating the number and pitch of accordion pleats 80 of strip 72 within coil 54b and, accordingly, the water mixing and residence time therein. Impeller 44b has substantially the advantages of impellers 44 and 44a.

Various other modifications, changes, alterations and additions can be made in the improved water purification device of the present invention, its components and parameters. All such modifications, changes, alterations and additions as are within the scope of the appended claims form part of the present invention.

What is claimed is:

1. A water purification device, said device comprising, in combination:
    (a) a hollow casing split into a pair of mating sections releasably connected together, for easy access to the inside of said casing;
    (b) a water pipe disposed in said casing and extending out opposite ends thereof;
    (c) a non-rotating, removable and replaceable water impeller releasably secured longitudinally in said pipe, said impeller including a plurality of spaced blade segments comprising turns of a single continuous helix, said segments being set at a predetermined pitch so as to mix and control the residence time of water passing through said pipe;
    (d) an electromagnetic coil disposed around said pipe in said casing; and,
    (e) means for varying the pitch of said turns, said means for varying the pitch of said turns comprising means for replacing said impeller with another impeller having a different pitch so as to change the residence time of the water passing through the pipe, and electrical means within said casing and extending out thereof for passing a current through said coil to energize said coil.

2. A water purification device, said device comprising, in combination:
    (a) a hollow casing split into a pair of mating sections releasably connected together, for easy access to the inside of said casing;
    (b) a water pipe disposed in said casing and extending out opposite ends thereof;
    (c) an electromagnetic coil disposed around said pipe in said casing;
    (d) a non-rotating, removable and replaceable water impeller releasably secured longitudinally in said pipe, said impeller including a plurality of spaced blade segments set at a predetermined pitch so as to mix and control the residence time of water passing through said pipe;
    (e) means for changing the location of said impeller in said pipe to any one of a plurality of selected locations, so as to extend partially or wholly, as desired within said coil; and, (f) electrical means within said casing and extending out thereof for passing a current through said coil to energize said coil.

3. A water purification device, said device comprising, in combination:
 (a) a hollow casing split into a pair of mating sections releasably connected together, for easy access to the inside of said casing;
 (b) a water pipe disposed in said casing and extending out opposite ends thereof;
 (c) an electromagnetic coil disposed around said pipe in said casing;
 (d) a non-rotating, flexible and accordion-shaped water impeller secured longitudinally in said pipe, said impeller including a plurality of spaced accordian pleats;
 (e) means for moving said impeller between a collapsed position and an extended position to change the number and pitch of said accordian pleats within said coil so as to mix and control the residence time of of water passing through said pipe; and
 (f) electrical means within said casing and extending out thereof for passing a current through said coil to energize said coil.

* * * * *